US006774188B1

(12) United States Patent
Robert et al.

(10) Patent No.: US 6,774,188 B1
(45) Date of Patent: Aug. 10, 2004

(54) CROSSLINKABLE COMPOSITIONS OF FUNCTIONALIZED POLYOLEFIN POWDERS

(75) Inventors: Patrice Robert, Beaumont-le-Roger (FR); Jean-Michel Pierrot, Grosley-sur-Risle (FR); Philippe Annoot, Saint Aubin le Guichard (FR); Martin Baumert, Serguigny (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/070,555

(22) PCT Filed: Sep. 5, 2000

(86) PCT No.: PCT/FR00/02441

§ 371 (c)(1),
(2), (4) Date: Jun. 28, 2002

(87) PCT Pub. No.: WO01/19911

PCT Pub. Date: Mar. 22, 2001

(30) Foreign Application Priority Data

Sep. 10, 1999 (FR) .......................................... 99 11353

(51) Int. Cl.[7] ......................... C08L 23/00; C08L 23/04; C08L 23/08; C08L 27/00

(52) U.S. Cl. ........................ 525/207; 525/208; 525/240

(58) Field of Search ................................ 525/207, 208, 525/240

(56) References Cited

U.S. PATENT DOCUMENTS

| | | | | |
|---|---|---|---|---|
| 4,612,349 A | * | 9/1986 | Nicco et al. | 525/117 |
| 5,037,888 A | * | 8/1991 | Vanderbilt | 525/108 |
| 5,483,001 A | * | 1/1996 | Hert | 525/166 |
| 5,792,816 A | | 8/1998 | Abend | |

FOREIGN PATENT DOCUMENTS

| | | |
|---|---|---|
| FR | 2 721 319 | 12/1995 |

OTHER PUBLICATIONS

PCT Notification Concerning the Transmission o the International Preliminary Examination Report (PCT/IPEA/416).

International Preliminary Examination Report (PCT/IPEA/409).

* cited by examiner

*Primary Examiner*—Nathan M. Nutter
(74) *Attorney, Agent, or Firm*—Smith, Gambrell & Russell, LLP

(57) ABSTRACT

The invention concerns a crosslinkable composition of functionalized polyolefin powder comprising a functionalized polyolefin (A) having an MFI of at least 20 (190° C. 2.16 kg), a product (B) having a function for crosslinking (A), the composition having a grain size distribution between 100 and 400 μm. Said composition is useful for slush moulding, for thermoforming sheets or injection on an insert.

7 Claims, No Drawings

CROSSLINKABLE COMPOSITIONS OF FUNCTIONALIZED POLYOLEFIN POWDERS

FIELD OF THE INVENTION

The present invention relates to crosslinkable compositions formed from functionalized polyolefin powders which can be used in the slush molding process or in the thermoforming of sheets or in injection molding over an insert and more particularly to compositions based on functionalized polyethylene.

PVC or polyolefin powders are used to obtain skins by the process of molding by the free flow of powder onto a hot mold (hereinafter called the slush molding process). Slush molding is used for the manufacture of skins for dashboards, door panels and consoles in the automobile field. The powder is brought into contact with the hot mold, for example by the free flow technique—the powder forms a skin by melting. These skins have a very soft feel and do not have residual stresses, which makes it possible, during the aging of the skin, to avoid the risk of the appearance of cracks caused by residual stresses relaxing.

BACKGROUND OF THE INVENTION

Automobile dashboards are very often made of polyurethane and covered with a PVC skin obtained by the slush molding process. It is becoming less possible to use PVC because of the risk of pollution caused by its combustion. It is therefore necessary to develop polyolefin skins. Polypropylene skins have already been disclosed in the prior art but these skins are not sufficiently resistant to the high temperatures which can be found in automobiles out in the sun and with closed windows—this resistance is measured by the hot creep.

Patent FR 2,721,319 discloses powder compositions for slush molding based on polypropylene and on ethylene-propylene rubber (EPR). The skins obtained do not have good creep resistance.

BRIEF DESCRIPTION OF THE INVENTION

Polyolefin powder compositions have now been found which can be used in slush molding, in the thermoforming of sheets or in injection molding over an insert and which are crosslinkable thus, abrasion resistance and good creep resistance are obtained. The present invention is thus a crosslinkable composition formed from functionalized polyolefin powder comprising:

a functionalized polyolefin (A) having an MFI of at least 20 (190° C./2.16 kg) containing an anhydride and/or epoxy functional group, a product (B) having the role of crosslinking (A), the composition having a particle size between 100 and 400 μm.

According to a first embodiment of the invention, (A) is chosen from copolymers of ethylene and an unsaturated carboxylic acid anhydride and (B) is chosen from copolymers of ethylene and an unsaturated epoxide.

According to a second embodiment of the invention, (A) is chosen from copolymers of ethylene and an unsaturated carboxylic acid anhydride and (B) is chosen from polyamines adsorbed on a zeolite.

According to a third embodiment of the invention, (A) is chosen from copolymers of ethylene and an unsaturated epoxide and (B) is chosen from polyamines adsorbed on a zeolite.

In the slush molding process, the composition of the invention is converted into a skin on contact with the mold. The crosslinking takes place at a higher temperature than the melting point of (A) when it is carried out while the skin is in the mold, such as, for example, in the three embodiments mentioned above. The crosslinking takes place at a temperature between room temperature and the softening point of (A) when this crosslinking is initiated subsequently by a process of moisture diffusion through the skin, such as, for example, in the second and third embodiment, if it is chosen to allow the moisture to drive the amine from the zeolite after formation of the skin.

DETAILED DESCRIPTION OF THE INVENTION

As regards the first embodiment, the copolymers (A) can be polyethylenes grafted with an unsaturated carboxylic acid anhydride or copolymers of ethylene and an unsaturated carboxylic acid anhydride which are obtained, for example, by radical polymerization.

The unsaturated carboxylic acid anhydride can be chosen, for example, from maleic, itaconic, citraconic, allylsuccinic, cyclohex-4-ene-1,2-dicarboxylic, 4-methyl-enecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. Maleic anhydride is advantageously used. It would not be departing from the scope of the invention to replace all or part of the anhydride with an unsaturated carboxylic acid, such as, for example, (meth)acrylic acid.

As regards the polyethylenes onto which the unsaturated carboxylic acid anhydride is grafted, <<polyethylene>> is understood to mean homo- or copolymers.

Mention may be made, as comonomers, of:

α-olefins, advantageously those having from 3 to 30 carbon atoms; mention may be made, as examples of α-olefins, of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene; these α-olefins can be used alone or as a mixture of two or of more than two, unsaturated carboxylic acid esters, such as, for example, alkyl(meth)acrylates, it being possible for the alkyls to have up to 24 carbon atoms; examples of alkyl acrylate or methacrylate are in particular methyl methacrylate, ethyl acrylate, n-butyl acrylate, isobutyl acrylate or 2-ethylhexyl acrylate, vinyl esters of saturated carboxylic acids, such as, for example, vinyl acetate or propionate, dienes, such as, for example, 1,4-hexadiene, the polyethylene can comprise several of the above comonomers.

The polyethylene, which can be a blend of several polymers, advantageously comprises at least 50% and preferably 75% (as moles) of ethylene and its density can be between 0.86 and 0.98 g/cm$^3$. The MFI (viscosity index at 190° C./2.16 kg) is advantageously between 20 and 1000 g/10 min.

Mention may be made, as examples of polyethylenes, of:

low-density polyethylene (LDPE)

high-density polyethylene (HDPE)

linear low-density polyethylene (LLDPE)

very low-density polyethylene (VLDPE)

polyethylene obtained by metallocene catalysis, that is to say polymers obtained by copolymerization of ethylene and an α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes may include transition metals from Groups IVA, VA and VIA. Metals from the lanthanide series can also be used.

EPR (ethylene-propylene rubber) elastomers

EPDM (ethylene-propylene-diene) elastomers blends of polyethylene with an EPR or an EPDM ethylene/alkyl(meth)acrylate copolymers possibly containing up to 60% by weight of (meth)acrylate and preferably 2 to 40%.

The grafting is an operation known per se.

As regards the copolymers of ethylene and an unsaturated carboxylic acid anhydride, that is to say those in which the unsaturated carboxylic acid anhydride is not grafted, these are copolymers of ethylene, an unsaturated carboxylic acid anhydride and optionally another monomer which can be chosen from the comonomers that were mentioned above in the case of the ethylene copolymers intended to be grafted.

Use is advantageously made of ethylene/maleic anhydride and ethylene/alkyl(meth)acrylate/maleic anhydride copolymers. These copolymers comprise from 0.2 to 10% by weight of maleic anhydride and from 0 to 40% and preferably 5 to 40% by weight of alkyl(meth)acrylate. Their MFI is between 20 and 100 (190° C./2.16 kg). The alkyl(meth) acrylates have already been described above. The melting point is between 80 and 120° C.

The copolymer (A) is commercially available—it is produced by radical polymerization at a pressure which can be between 200 and 2500 bar. It is sold in the form of granules. It can be powdered by microgranulation, for example by using the underwater cutting technique of the company Gala (Virginia, USA) or by cryogenic grinding.

As regards (B), the copolymers of ethylene and of an unsaturated epoxide, these can be obtained by copolymerization of ethylene and of an unsaturated epoxide or by grafting the unsaturated epoxide onto the polyethylene. The grafting can be carried out in the solvent phase or onto the molten polyethylene in the presence of a peroxide. These grafting techniques are known per se. Regarding the copolymerization of ethylene and of an unsaturated epoxide, use may be made of the processes referred to as radical polymerization processes which usually operate at pressures between 200 and 2500 bar.

Mention may be made, as examples of unsaturated epoxides, of:

aliphatic glycidyl esters and ethers, such as allyl glycidyl ether, vinyl glycidyl ether, glycidyl maleate, glycidyl itaconate and glycidyl (meth)acrylate, and alicyclic glycidyl esters and ethers, such as 2-cyclohexene-1-glycidyl ether, diglycidyl cyclohexene-4,5-carboxylate, glycidyl cyclohexene-4-carboxylate, glycidyl 5-norbornene-2-methyl-2-carboxylate and diglycidyl endo-cis-bicyclo[2.2.1]hept-5-ene-2,3-dicarboxylate.

As regards the grafting, the copolymer is obtained from the grafting of a polyethylene homopolymer or copolymer as described for (A), except that an epoxide is grafted instead of an anhydride. As regards a copolymerization, this is also similar to (A) except that an epoxide is used. There may also be other comonomers, as in the case of (A).

The product (B) is advantageously an ethylene/alkyl (meth)acrylate/unsaturated epoxide copolymer. It may advantageously contain up to 40% by weight of alkyl(meth) acrylate, preferably 5 to 40%, and up to 10% by weight of unsaturated epoxide, preferably 0.1 to 8%.

The epoxide is advantageously glycidyl (meth)acrylate.

The alkyl(meth)acrylate is advantageously chosen from methyl (meth)acrylate, ethyl acrylate, n-butyl acrylate, isobutyl acrylate or 2-ethylhexyl acrylate. The amount of alkyl(meth)acrylate is advantageously from 20 to 35%. The MFI is advantageousely between 5 and 100 (in g/10 min at 190° C./2.16 kg) and the melting point is between 60 and 110° C. This copolymer can be obtained by radical polymerization of the monomers. The process for forming a powdering is carried out as for (A).

It would not be departing from the scope of the invention if the composition were to comprise several polymers (A) and/or several polymers (B). (This applies to all the embodiments).

As regards the proportions of (A) and (B), these are advantageously such that there are 0.1 to 1.5 (preferably 0.2 to 0.6) anhydride functional groups per epoxide functional group. It is advantageous to use a catalyst, that is to say a product capable of accelerating the reaction between the anhydride functional groups and the epoxide functional groups. This catalyst acts right from the melting of (A) and (B) which have to be similar. The proportion of catalyst is easily determined by a person skilled in the art, these reactions between anhydride and epoxide functional groups being known per se. The crosslinking is advantageously carried out by heating the mold at a temperature above the melting point of (A).

Mention may in particular be made, among the compounds capable of accelerating the reaction between the epoxy functional group present in (B) and the anhydride functional group present in (A), of:

tertiary amines, such as dimethyllaurylamine, dimethylstearylamine, N-butylmorpholine, N,N-dimethylcyclohexylamine, benzyldimethylamine, pyridine, 4-dimethyl-aminopyridine, 1-methylimidazole, tetramethylethyl-hydrazine, N,N'-dimethylpiperazine, N,N,N',N'-tetramethyl-1,6-hexanediamine or a mixture of tertiary amines having from 16 to 18 carbon atoms and known under the name of dimethyltallowamine, tertiary phosphines, such as triphenylphosphine, zinc alkyl dithiocarbamates, acids, such as polymers like LUCALEN (an ethylene/butyl acrylate/acrylic acid terpolymer), magnesium salts such as mixtures containing 65% stearate salt and 35% palmitate salt.

As regards the second embodiment of the invention, the functionalized polyethylene (A) has already been described in the first embodiment. (B) is a polyamine adsorbed on a zeolite—under the effect of a temperature rise, the polyamine is desorbed and crosslinks (A). It is sufficient to choose a polyamine/zeolite pair such that the desorption takes place at least at the melting point of (A). The desorption is also brought about by water or moisture, which it is why it is recommended to add, to the zeolite charged with polyamine, another zeolite capable of adsorbing the moisture in order to prevent crosslinking during storage. This technique for crosslinking a polymer comprising carboxylic acid anhydride groups with zeolites which release polyamines under the effect of the temperature or of the moisture has been disclosed in U.S. Pat. No. 5,792,816, the contents of which are incorporated in the present application.

Mention may be made, as examples of polyamine, of: ethylenediamine, propanediamine, butanediamine, pentanediamine, hexanediamine, the isomers of the preceding amines, 1,2-diaminocyclohexane, 1,4-diaminocyclohexane, diethylenetriamine, triethylenetetramine, tetraethylenepentamine, 3-[(N-aminoethyl)amino]propyltrialkoxysilane, triaminopropyltrialkoxysilane, piperazine, aminoethylpiperazine, diaminoethylpiperazine, xylylenediamine, isophoronediamine, 3,3'-dimethyl-4,4'-diaminocyclohexylmethane or 1,4-diaminobenzanilide. A portion of the polyamine can be replaced with polyols or aminoalcohols, such as, for example: ethylene glycol, propylene glycol, triethylene glycol, dipropylene glycol, butanediol, neopentyl glycol, cyclohexane-dimethanol, hydroquinone bishydroxyl ether, triethanolamine, methyldiethanolamine, tripropanolamine, N,N-di(2-hydroxyethyl)aniline, ethanolamine, diethanolamine, propanolamine, dipropanolamine and N-(hydroxyethyl) aniline. Regarding the zeolites, use is advantageously made of those having pore diameters between 0.3 and 1.5 nm and preferably of a zeolite chosen from the following four (the pore diameter is shown):

0.38 nm, designated as type 4A, 0.44 nm, designated as type 5A, 0.8 nm, designated as type 10X, 0.84 nm, designated as type 13X.

All these zeolites are available with a particle size of the order of 20 to 50 μm. The zeolite can, in addition to the polyamine, be charged with a catalyst for the reaction of the anhydride and the amine. Various examples of desorption temperatures are given below:

| Zeolite | Amine | Desorption temperature (° C.) |
|---|---|---|
| 4A | Ethylenediamine | 175 +/− 5 |
| 4A | Ethanolamine | 175 +/− 5 |
| 13X | Ethylenediamine | 130 +/− 5 |
| 13X | Ethanolamine | 125 +/− 5 |
| 13X | Diethylenetriamine | 125 +/− 5 |
| 13X | Piperazine | 120 +/− 5 |

Once the skin has formed, the crosslinking can be carried out by heating beyond the melting point of (A) or subsequently, the skin having been removed from the mold, by diffusion of the ambient moisture at a temperature of between room temperature and the softening point of (A).

As regards the third embodiment of the invention, this is of the same type as the second embodiment but the copolymer of ethylene and of a carboxylic acid anhydride is replaced with a copolymer of ethylene and of an epoxide. Such a copolymer has already been described as polymer (B) in the first embodiment. It is sufficient only for it to have an MFI of at least 20.

The grafting reaction is carried out in a single-screw or twin-screw extruder fed with polyolefins from a feed hopper, for example in the form of granules. The polyolefins are melted by heating in a first zone of the extruder and the reactants are introduced into the melt of the polyolefins in a second zone.

The radical initiators may be chosen from peroxides, peracids, peresters and peracetals. In general, they are used in an amount from 0.01% to 0.5% by mass with respect to the polyolefins to be grafted.

The compositions of the invention may also include anti-caking agents such as the silica AEROSIL R972, processing aids such as ethylene bis(stearamide), mold release agents, such as calcium stearate or magnesium stearate, and other ingredients, such as tackifying resins, such as the resin REGALITE R1115.

They may also include processing stabilizers such as IRGAFOS 168, DDPP, P-EPQ, TNPP, TPP, PS 800 and PS 802, antioxidants, such as IRGANOX 1010, 245, 259, 565, 1035, 1076, 1098, 1135, 1141, 1330, 1425, 3052, 3114, 5057 and M1024, mixtures of antioxidants and processing stabilizers, such as IRGANOX B225, and UV stabilizers, such as the TINUVIN and CHIMASSORB range from Ciba.

They may also include fillers and coloring pigments, such as carbon black and $TiO_2$.

They may also include deodorizing agents, such as active carbon: for example 3S, CXV (CECA), undecylenic acid, ethyl undecylenate, calcium undecylenate, zinc undecylenate cyclodextrin, zeolites, such as FLAVITH, and fragrances.

After the skin has been formed by melting the powder blend (A)+(B) on the hot mold, excess unmelted powder is removed and then the crosslinking can be continued or initiated by placing the skin in an oven at a temperature of between 200 and 350° C. for a time of between 10 s and 10 min. The skin is subsequently separated from the mold after cooling. It is also possible, in the second and third embodiment, to remove the skin from the mold and then crosslink it with moisture.

The compositions of the invention make it possible to obtain skins which have a very soft touch, which have a Shore A hardness of less than 90 without the use of liquid plasticizers, and which do not exhibit creep when hot. These skins advantageously have the following characteristics:

the thickness is between 0.6 and 1.1 mm the tensile strength (TS) is at least 5 MPa the elongation at break (EB) is at least 300% the aging after 500 h at 100° C., expressed by the variation in elongation, is at most 40% the aging after 250 h at 120° C., expressed by the variation in elongation at break, is at most 50% the aging after 250 h at 120° C., expressed by the variation in the tensile strength, is at most 10% the elongation after creep at 140° C. under a load of 0.5 bar is at most 30% fogging, DIN 75201 (3 h at 100° C.): no deposition (by measuring the migration of phthalates)

abrasion resistance and abrasive wear resistance after 30 min: meets the standards gloss: meets the standards heat withstand (22 h at 100° C.): meets the standards.

EXAMPLES

Except when otherwise indicated, the compositions of the products (% of acrylate, and the like) and the compositions of the powders of the invention are by weight.

The following products were used:

LOTADER® 8900, an ethylene/methyl acrylate/glycidyl methacrylate (GMA) copolymer containing 28% acrylate and 7.8% GMA, with an MFI of 6;

LOTADER® 6660, an ethylene/ethyl acrylate/maleic anhydride (MAH) copolymer containing 27.5% acrylate and 2.9% MAH, with an MFI of 40;

LOTADER® 7500, an ethylene/ethyl acrylate/maleic anhydride (MAH) copolymer containing 20.0% acrylate and 3.0% MAH, with an MFI of 70;

LOTADER® AX 8999, an ethylene/butyl acrylate/glycidyl methacrylate (GMA) copolymer containing 28% acrylate and 1% GMA, with an MFI of 70;

XX 1275, a catalyst, dimethyltallowamine (DMTA) in the form of a 3% masterbatch in an ethylene/butyl acrylate/MAH copolymer containing 32% acrylate and 3% MAH, with an MFI of 7;

LUCALEN A3110M, an ethylene/butyl acrylate/acrylic acid copolymer containing 8% acrylate and 4% acrylic acid, with an MFI of 6–8 (190° 2.16 kg);

IRGANOX B 225, 1:1 IRGANOX 1010/IRGAFOS 168;

TACKIFYING RESIN, REGALITE R1125;

MM, a carbon black;

MAGNESIUM STEARATE, mixtures of 65% stearate salt and 25% palmitate salt;

AEROSIL R972 (from Degussa);

ACTIVE CARBON, 3S and CXV (from CECA).

The various constituents above were reduced to a powder with a particle size of 200 μm by cryogenic milling.

The various compositions of the invention were prepared by blending the constituents in a powder blender. Skins were prepared by the slush molding technique. The mold was brought to a temperature of 250° C. in an oven. The mold, removed from the oven, was subsequently covered with an excess of powder of the composition used. After approximately 10 s, the unmelted powder is removed by turning over the mold. The mold is then again brought to 250° C. in the oven for 3 min. The mold is subsequently cooled in cold water. The skin is subsequently removed from the mold. The compositions and the properties are collated in the following table 1.

Examples 5 and 6

Example 5 is a black skin and example 6 is a gray skin. These examples give better performance than examples 1 and 4 in terms of abrasion, mechanical properties, toxicity (no dimethylsulfamine), better heat aging resistance (antioxidants) and less odor (active carbon).

The manufacture of the powder is divided into various steps. This manufacture is identical for all the formulations.

1. Compounding of the Formulation Based on LOTADER 8900 (=A) and LOTADER 7500 (=B) (Example 5).

The following formulations A were compounded in a Leistritz twin-screw extruder with venting, at a temperature of 160° C., and formulations B were compounded in a Leistritz twin-screw extruder with venting, at a temperature of 180° C.

| Example 5 (black) | Formulation A (in parts) | Formulation B (in parts) |
|---|---|---|
| LOTADER 8900 | 96.0 | — |
| LOTADER 7500 | — | 68 |
| REGALITE R1125 resin | 2.0 | 2.0 |
| IRGAFOS 168 | 0.4 | 0.4 |
| IRGANOX 1010 | 1.0 | 1.0 |
| MM, carbon black | 1.0 | 1.0 |
| LUCALEN M 3110 | — | 28.0 |
| Active carbon 3S | 1.0 | 1.0 |
| Active carbon CXV | 1.0 | 1.0 |

2. Dry Blend of the Granules of the 2 Components in Defined Proportions

The A and B granules were dry-blended with the A/B mass ratio=1.575.

3. Manufacture of the Powder by Cryogenic Grinding and Incorporation of Additives The formulations were then cryogenically ground into a powder having a particle size of 200 μm and then 2% of magnesium stearate and 0.6% of AEROSIL silica were added to the high-speed mixer.

4. Slush Molding

The mold was treated at 100° C. with a mold-release agent and heated at 120° C. for 20 min. (Chem-Trend S.A. Mono Coat MC-708A) and taken up to a temperature of 250–300° C. in an oven. Next, the mold removed from the oven was covered with an excess amount of powder of the composition used. After about 10 s, the unmelted powder was removed by turning the mold upside down. The mold was then heated again in the oven at 250–300° C. for 1–5 min. The mold was then cooled in cold water. The skin was then removed from the mold.

The compositions and properties of the formulations of examples 5 and 6 are the following:

| Compound | Example 5 (black) (in parts) | Example 6 (gray) (in parts) |
|---|---|---|
| LOTADER 8900 | 55.7 | 54.6 |
| LOTADER 7500 | 26.3 | 26.3 |
| LUCALEN M 3110 | 10.8 | 10.1 |
| IRGANOX 1010 | 1 | — |
| IRGAFOS 168 | 0.4 | — |
| IRGANOX B225 | — | 1 |
| REGALITE R1125 resin | 2 | 2 |
| $TiO_2$ | | 2.9 |
| Active carbon 3S | 1.0 | 1.0 |
| Active carbon CXV | 1.0 | 1.0 |
| MM, carbon black | 1 | 0.3 |
| Addition by dry blending | | |
| Magnesium stearate | 2 | 2 |
| AEROSIL R 972 | 0.6 | 0.6 |
| Properties | | |
| Tensile strength (MPa) | >6 | >6 |
| Elongation at break (%) | >300 | >300 |
| Creep 0.5 bar (min) 140° C. | >30 | >30 |
| Variation in elongation at break after aging (250 h at 120° C.) (%) | <50 | <50 |
| Variation in tensile strength after aging (250 h at 120° C.) (%) | <10 | <10 |
| Fogging, DIN 75201 (3 h at 100° C.) | No deposit | No deposit |

TABLE 1

| | Ex. 1 | Ex. 2 | Ex. 3 | Ex. 4 | Ex. 7 | Ex. 8 |
|---|---|---|---|---|---|---|
| LOTADER 8900 | 3.48 | | 3.48 | 24.4 | 28.4 | 17.4 |
| LOTADER 6600 | 63.2 | 18.8 | 63.2 | 49.9 | 51.6 | 41 |
| LOTADER AX 8999 | | 79.2 | | 23.7 | | 39.6 |
| XX 1275 | 2 | 2 | 2 | 2 | | |
| Losses in g, Taber test | 0.075/ 0.018 | | | | 0.0196 | |
| Mean losses in g, Taber test | 4.6 | | | | | |
| Standard deviation of the losses | 4.0 | | | | | |
| Creep resistance at 120° C. without load with 3 min of post-smoothing at 250° C. | | | Holds 30 min | Holds 30 min | | Holds 30 min |

What is claimed is:

1. A slush-moldable, crosslinkable composition formed from functionalized polyolefin powder comprising from 80.9% to 100% by weight of:

a functionalized polyolefin (A) having an MFI of at least 20 g/10 min. (190° C./2.1.6 kg) containing an anhydride and/or epoxy functional group;

a product (B) having the role of crosslinking (A), the composition having a particle size between 100 and 400 μm, wherein (B) is selected from copolymers of ethylene and an unsaturated epoxide.

2. The composition as claimed in claim 1, wherein (A) is selected from copolymers of ethylene and an unsaturated carboxylic acid anhydride.

3. The composition as claimed in claim 2, wherein (A) is selected from ethylene/alkyl(meth)acrylate/maleic anhydride copolymers, these copolymers comprising from 0.2 to 10% by weight of maleic anhydride and from 5 to 40% by weight of alkyl(meth)acrylate.

4. The composition as claimed in claim 1, wherein the product (B) is an ethylene/alkyl(meth)acrylate/unsaturated epoxide copolymer which can contain up to 40% by weight of alkyl(meth)acrylate and up to 10% by weight of unsaturated epoxide.

5. The composition as claimed in claim 1, wherein (A) and (B) are present in proportions so as to provide from 0.1 to 1.5 anhydride functional groups per epoxide functional group.

6. The composition as claimed in claim 1, wherein (A) and (B) are present in proportions so as to provide from 0.2 to 0.6 anhydride functional groups per epoxide functional group.

7. The composition as claimed in claim 1, comprising from 98% to 100% by weight of (A) and (B).

* * * * *